Oct. 5, 1965

G. ALFIERI ETAL 3,210,132

SERVO AUTODISTRIBUTOR FOR TRAILER VEHICLES
EQUIPPED WITH PNEUMATIC BRAKE SYSTEM

Filed Oct. 30, 1963

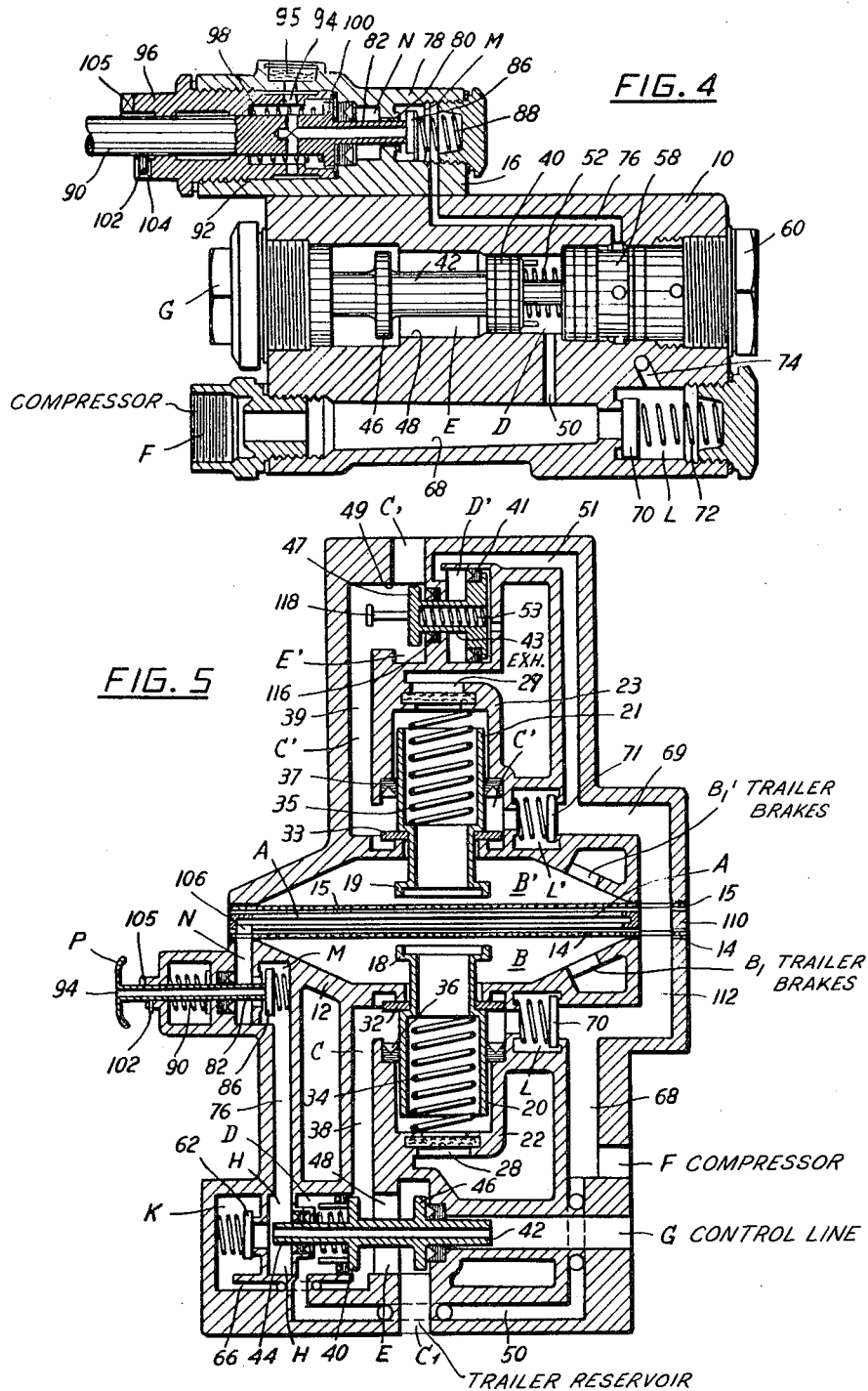

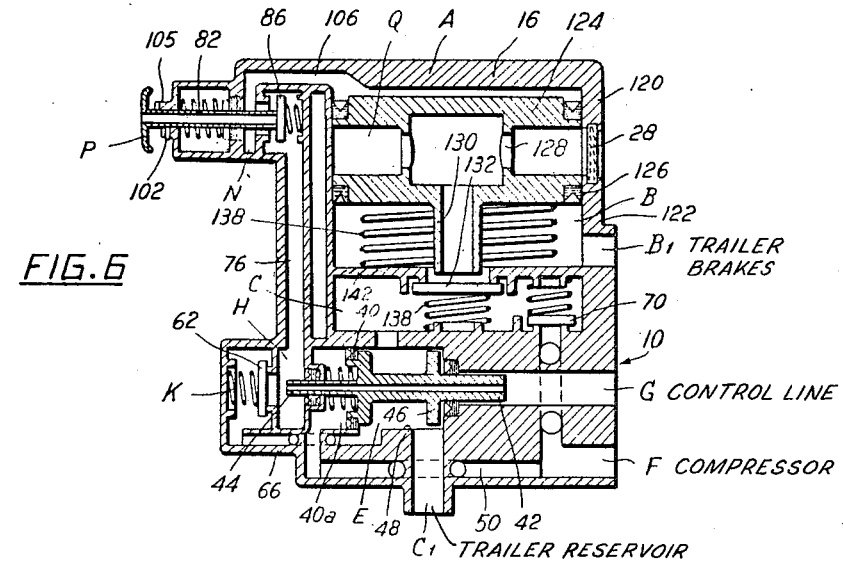
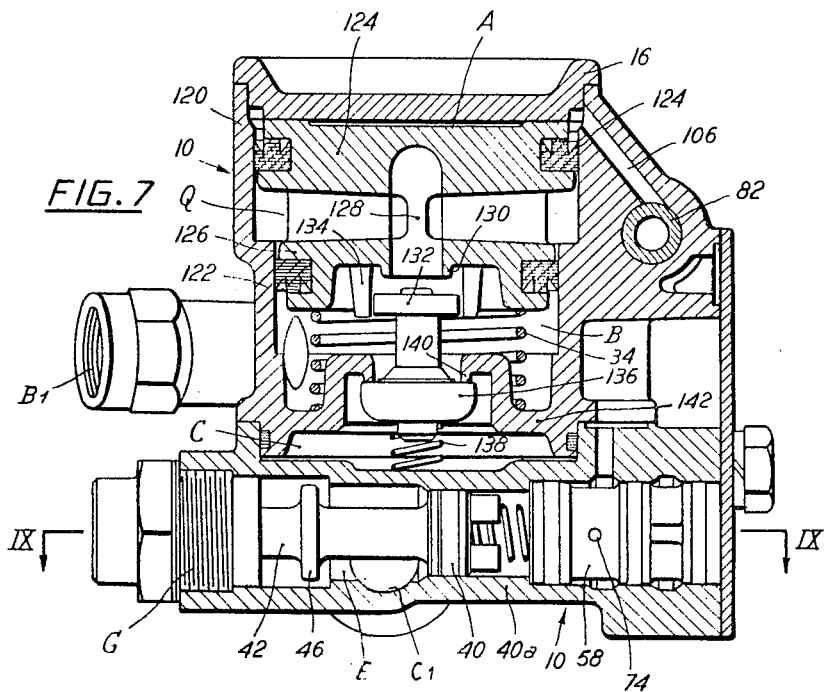

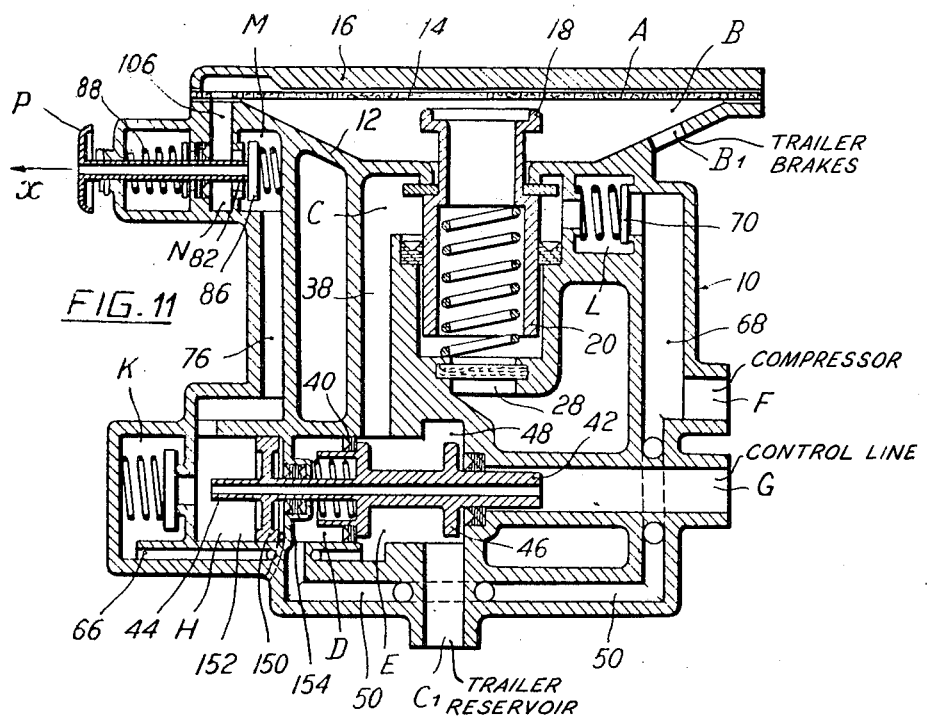
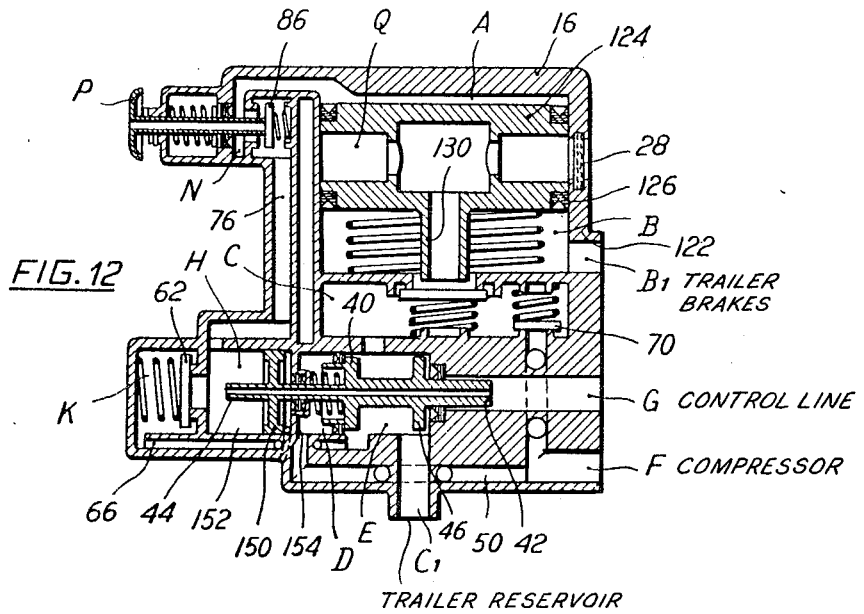

United States Patent Office 3,210,132
Patented Oct. 5, 1965

3,210,132
SERVO AUTODISTRIBUTOR FOR TRAILER VEHICLES EQUIPPED WITH PNEUMATIC BRAKE SYSTEM
Giuseppe Alfieri and Roberto Moriondo, Milan, Italy, assignors to Fabbrica Italiana Magneti Marelli S.p.A., Milan, Italy, a corporation of Italy
Filed Oct. 30, 1963, Ser. No. 320,158
Claims priority, application Italy, Nov. 17, 1962, 22,692/62; May 7, 1963, 9,565/63
10 Claims. (Cl. 303—40)

The present invention deals with a servo autodistributor for trailer vehicles equipped with pneumatic brake system actuatable from the driver's cab.

Similar devices are particularly intended for braking the trailer in the conventional manner, i.e. simultaneously with the braking of the motor truck and for the automatic braking, too, of said trailer when the latter is unhooked or accidentally breaks from the former.

Several servo autodistributors intended for the aforesaid scope are usually available from the trade, such as the Wagner's, Lockheed's, etc.

Common type servo-autodistributors comprise a device permitting to normally brake the trailer while braking the truck.

The automatic intervention of the servo auto distributor when the trailer is unhitched from the truck is performed by means of a spring which works upon a pneumatic piston influenced by the pressure air flowing from the emergency line.

In the above instance, i.e. when the trailer is unhooked from the truck the pneumatic piston runs out of the compressed air flowing from the emergency line. The spring which influences such piston displaces the latter so as to first close a valve shutting off the communication between the servo autodistributor and the service control line, and thence open an inlet valve delivering the air from the reservoir (installed on the trailer and connected with the servo autodistributor) to the device which automatically actuates the brakes of said trailer.

Even when in the emergency line the pressure falls down to a level below a predetermined value, the servo autodistributor must operate in order to brake the trailer.

These known servo autodistributors present, however, two disadvantages in that while on the one hand the automaticity of their invention is confided to a mechanical member (such as the a/s spring influencing the pneumatic piston) which is subjected to breakage or variation of its physical characteristics, on the other hand the intervention of said mechanical member takes place all of a sudden whereby abnormal stress is exerted on the draft gear and on the vehicle while in motion every time the servo autodistributor is actuated for dropping the pressure in the emergency line.

The servo autodistributor according to the present invention eliminates the aforesaid and other disadvantages.

Such servo autodistributor consisting of three groups of change-over valves, the first and second of which may be actuated by differentially surfaced members or by the pressure existing in the reservoir tank or by the pressure of the service control line and by the pressure of the emergency line in order to establish the communication of the means actuating the trailer's brakes with the atmosphere or with said trailer's reservoir while the third group of change-over valves may be manually actuated and controls the communication of one of the chambers of the differentially surfaced members of the second group of change-over valves with the atmosphere or with said trailer's reservoir, is characterized in that the movable part of the differentially surfaced member of the second set of change-over valves comprises suitable throttling means disposed in the passage which connects a collecting chamber to a connector whereto leads the trailer's reservoir, and which communicates, through the first group of change-over valves, with the means actuating the trailer's brakes and through the second group of change-over valves with the differentially surfaced members actuating said first group of change-over valves so that when the trailer is detached from the truck or when the pressure in the emergency line falls down to a level below a predetermined value, the second group of change-over valves is displaced and actuates the throttling means so as to narrow the passage section between the reservoir of the trailer and said collecting chamber so that the emergency braking may be gradually effected.

According to the invention, the differentially surfaced members actuating the first set of change-over valves consist of an elastic membrane influencing the elements of said group of valves and which is secured to the edge of a cup by a cover so as to delimitate among these parts two chambers, one of which communicates with the braking means and the other with the second and with the third groups of valves. Alternatively, said differentially surfaced members might as well consist of pistons conveniently shaped in order to strengthen or increase the trailer's braking action compared with that of the truck's. Moreover, the servo autodistributor may consist of two sections by intercoupling two elementary servo autodistributors.

In consideration of the further requirements these servo autodistributors must answer to the present invention has also the object of affording the possibility to effect directly from the cab the emergency braking of the trailer and in general the controlled braking of said trailer by actuating appropriate means installed on the truck.

Devices apt to realize these requirements are already commonly known; e.g. patent application No. 32,779 dated March 11, 1963, filed by the same applicant, describes a pneumatic braking device comprising appropriate means, manually actuated and placed on the tractor, for actuating the brakes of the trailer in case of failure or breakdown of the service control line of said device.

In view of the above, the present invention has the object of making the servo autodistributor apt to brake the trailer even when the service control line is unavailable for any whatsoever reason.

According to these preliminary remarks, the servo autodistribtuor is characterized in that the movable part of the set of change-over valves sensitive to the pressure of both the automatic braking system and the trailer's reservoir tank, communicates with the movable part of a cylinder-piston set sensitive to the pressure existing in the service control line, so that when the emergency line is connected with the exhaust, said group of valves is thereby actuated in order to control and modulate the flow of compressed air from the reservoir to the other group of change-over valves checking the air flow from said reservoir to the trailer's braking means.

In a preferred embodiment of the device to the bored rod provided by the first group of change-over valves sensitive to the automatic braking is cooperable a piston travelling inside a cylinder one of whose chambers communicates with both the intermediate chamber of said first group of change-over valves, and through the group of change-over valves of the servo-autodistributor manually actuatable with the second group of change-over valves checking the air flow to the trailer's braking means.

The invention will now be more fully described in the light of the accompanying drawings which illustrate exemplary embodiments of the servo autodistributor.

In the drawings:

FIGURES 1a and 1b are a fragmentary sectional view of FIGURE 1 showing the positional displacement of members illustrated in FIGURE 1;

FIGURES 3 and 4 are sectional views respectively taken on the lines III—III and IV—IV of FIGURE 2;

FIGURE 5 is a schematic sectional view of a membrane type two-section servo autodistributor;

FIGURE 6 is a schematic sectional view of a one-section piston servo autodistributor;

FIGURE 7 is a vertical, median sectional view of a preferred embodiment of the servo autodistributor according to FIGURE 6;

Figure 1:
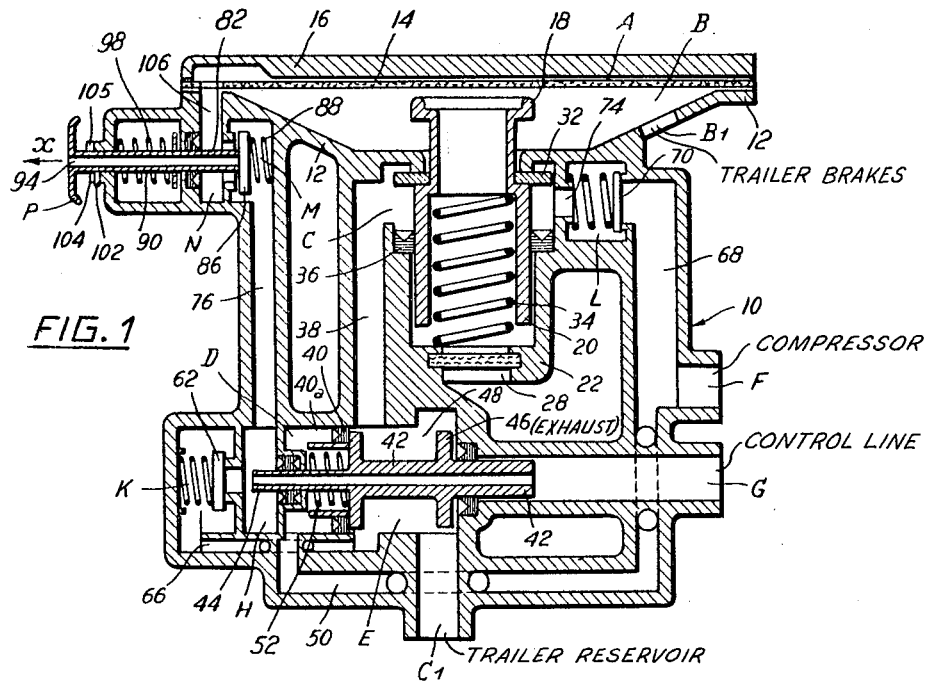
FIGURE 1 is a longitudinal sectional view of a servo autodistributor at a portion wherein the pressure-sensitive means are formed by a membrane.
Figure 1:
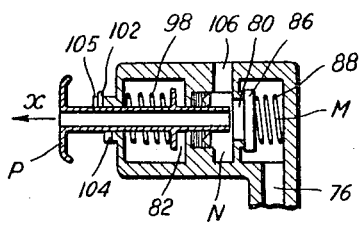
Figure 1:
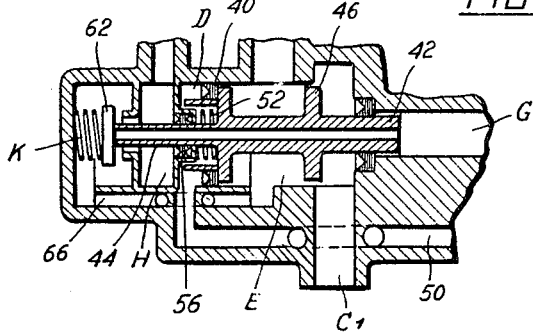

FIGURES 11 and 12, corresponding to FIGURES 1 and 6, are longitudinal sectional views of two further variants of embodiment of the servo autodistributor.

Referring to the embodiment illustrated by FIGURES 1 to 4, the servo autodistributor includes a casing 10, the upper portion of which ends with a cup 12 to whose edge is tightly fitted an elastic membrane 14 by means of a cover 16 so shaped as to originate a chamber A between its inner face and said membrane.

Said chamber A is in opposite position to a chamber B which through a connector $B_1$ communicates with the actuating means of the trailer's brakes. Chamber A, when the membrane is at rest, provides a very limited volume and may rest against the inner surface of cover 16 through ribs or webs.

The central portion of membrane 14, when the latter is stretched, cooperates with the ring-shaped part 18 provided by a sliding bush 20 travelling inside a guide member or bonnet 22 (see FIGURE 2) secured by a screw to casing 10, the movements of said bush being controlled by bottom cap 24 of said bonnet provided with openings 26 which put it in communication with the atmosphere through a membrane valve 28 secured to said bottom.

Bush 20 includes at its upper end a rim 30 adapted to receive a gasket 32 co-operating with the bottom of cup 12 so as to form an inlet valve. A spring 34 is fitted around bush 20 and is thus maintained on one side by means of ring 30 and on the other side by means of a gasket 36, engaging the edges of bonnet 22 to form an air tight closure. Spring 34 operates so as to hold gasket 32 pressed against the housing thereof formed by the bottom of cup 12.

The housing carried by casing 10, wherein bush 20 is located, delimitates an annular chamber C forming a collecting chamber which communicates, through the valve formed by gasket 32 and the bottom of cup 12, with chamber B, and through a passage 38 (see FIGURES 2 and 3) with a connector $C_1$ whereto leads the trailer's reservoir.

Casing 10 comprises a housing 40a (FIG. 1) whose axis is at right angles with the axis of bush 20 to snugly receive a piston 40 travelling in tight sealing relation internally of a portion of said housing and which delimitates a pressurized chamber D and a throttling chamber E opposite each other, which will be hereinafter described. Piston 40 cooperates with a bored stem 42 having a rod terminal 44, the bores of both said stem and rod being located in succession so as to form a passageway. The full diameter of rod 44 is considerably smaller that that of stem 42 so that piston 40 shows differential surfaces. The smaller surface of said piston delimitates one of the walls of the throttling chamber E, whose opposite wall is formed by a bottom cap 46 cooperable with stem 42 and whose periphery cooperates with a neck 48 formed in the throttling chamber E and inserted between trailer reservoir connector $C_1$ which communicates with the trailer's reservoir, and said passage 38. The larger surface of piston 40 delimitates the bottom area of chamber D which through a passage 50 communicates with a connector F whereto leads the emergency line of the truck.

Upon the just considered piston 40 works a low-load spring 52 which holds the end of stem 42 of said piston engaged against shoulder 54 (FIG. 3) carried by a connector G whereto leads the service control line of the train.

The end of rod 44 engages gaskets 56 carried by a sleeve member 58 retained in aforesaid housing by a cap 60 screwed to casing 10. The end of said rod comes out at a chamber H formed inside sleeve 58 and which is closed by a disc valve 62 with which said rod can cooperate to keep it off its seat in opposition to the action of a spring 64.

Figure 3:
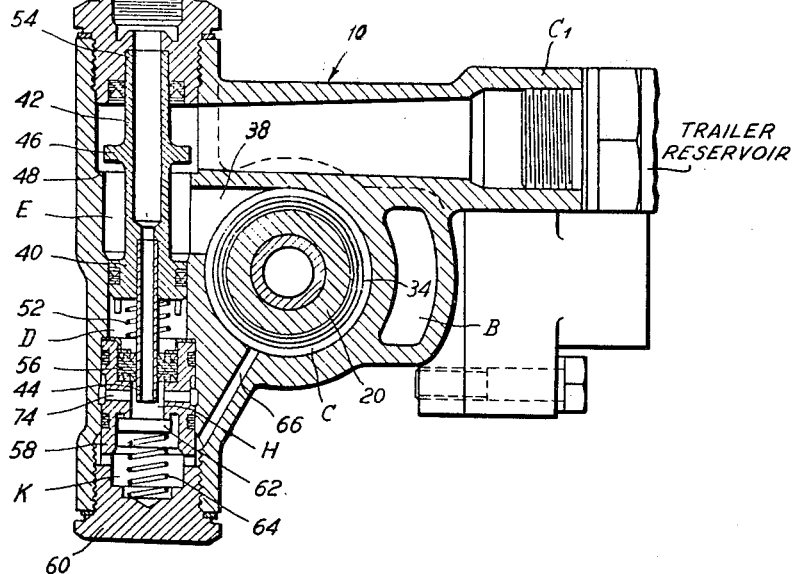

A chamber K provided by cap 60 and which is delimitated by valve 62, communicates through a passage 66 with throttling chamber E and collecting chamber C (see FIGURE 3).

The considered connector F communicates with a passage 68 with which communicates passage 50 which in turn communicates with a chamber L through a valve 70 influenced by a spring 72 which holds it constantly pressed against its seat. Chamber L communicates through an opening 74 with collecting chamber C.

Chamber H communicates through a series of bores radially located in sleeve 58 with a passage 76 (see FIGURE 2) which leads to a chamber M which provides a hollow projecting part 78 provided in the upper part by cap 16. Hollow projecting part 78 provides a chamber N which communicates with aforesaid chamber M through an annular opening 80 delimitated by a bored rod 82 and the seat 84 of a valve 86 which is held pressed against its seat by a spring 88. Bored rod 82 is cooperable with a rod 90 fitted with a related actuating means manually operatable such as a ball grip, a handle or the like. Bored rod 82 communicates through holes 92 radially located in rod 90 with an outlet 94 fitted with a filter 95. Rod 90 is guided so as to slide within a threaded bush 96 engaging the hollow projecting part 78 which retains a spring 98 influencing a collar 100 of said rod to constantly press the end of rod 82 against valve 86 causing the latter to be displaced from the seat thereof.

Rod 90 has at its end a radial plug 102 adapted to commutatively engage notches 104 and 105 provided by a slanting ring-shaped member of differential height cooperable with threaded bush 96.

In this manner rod 82 may be held in the position shown by FIGURES 1 and 4 or in the position shown by FIGURE 1a, in the latter instance valve 86 being held against its seat.

The afore-considered chamber N communicates through passage 106 with chamber A delimitated by cover 16 and membrane 14 in order to therein establish a determined amount of pressure as will be hereinafter described.

At this point, after having illustrated the structure of the servo autodistributor in question, there will be now described its operation relative to the different conditions of the brake controlling system installed on the train (viz. trailer and tractor), said brake controlling system comprising, in addition to the servo autodistributor in question and the brake actuating means, also a compressor, a main reservoir tank installed upon the truck, and a distributor actuated by the driver.

(1) *Condition of the servo autodistributor while replenishing the trailer's reservoir*

Replenishment of the reservoir installed on the trailer with compressed air coming from the compressor is made through connector F communicating with the line leading to the compressor provided by the brake controlling system. Attention is drawn to the fact that when the trailer is hooked up to the truck, the set of valves 82–86 manually actuatable by control member P is in the position as shown in FIGURES 1 and 4, viz. rod 82 engages valve 86 which establishes the communication of chamber A, through chamber N and passage 76 with chamber H and also with service control line connector G.

Compressed air from connector F works on check valve 70 which is thus displaced from its seat and, through passage 74, flows into collecting chamber C and thence, through chamber E and connector $C_1$ arrives at the trailer's reservoir. In addition, compressed air from connection F flows into chamber D through passage 50 in order to work upon the larger surface area of differential piston 40.

Due to the pressure amount of air in chambers D, E and K being of even value and since the larger surface area of differential piston 40 is that concerned with chamber D, the pressure amount of air in said chamber D exerts upon differential piston 40 a thrust prevailing over the thrust exerted by the air on the other face of said piston. Therefore said piston, owing also to the accompanying influence of spring 52, is maintained in the position as shown by FIGURES 1 and 3, in which position the bottom cap 46 is disengaged from neck 48 so that the compressed air may freely flow into passage 38.

Compressed air from collecting chamber C flows through passage 66 into chamber K whose passage toward chamber H is closed by valve 62 held engaged against its seat in that rod 44, cooperable with differential piston 40, is kept disengaged from said valve 62. When the trailer's reservoir is filled with air, since there is no longer any pressure difference between passage 68 and chamber L, i.e. upstream and downstream of valve 70, the latter under the influence of spring 72 engages against its seat.

(2) *Condition of the servo autodistributor while the train is in motion*

When the train (i.e., trailer and truck) is in motion and assuming that the reservoir is filled with air, the servo autodistributor maintains the conditions heretofore considered and its members are at a standstill and inoperative.

(3) *Braking the train*

The actuation of pneumatic distributor of the braking system (installed upon the truck) delivers compressed air to the service control line which leads to connector G.

Compressed air flows through bores of stem 42 and rod 44 and fills chamber H whence through bores 74 and 76 flows into chamber M.

Due to the fact that, as heretofore described, valve 86 is displaced from its seat by rod 82, the air of chamber M flows into chamber N whence, through passage 106 it flows into chamber A delimitated by cover 16 and membrane 14. Consequently, the air pressure bends membrane 14 whose central portion presses against crown 18 carried by bush 20 thereby closing the exhaust. The further stretching of said membrane 14 displaces bush 20 in opposition to the action of spring 34 and displaces gasket 32 from its housing provided by cup 12, thus establishing the communication between collecting chamber C and chamber B which faces chamber A, whereupon the air from the trailer's reservoir feeds through connection $B_1$ the actuating means of the trailer's brakes simultaneously with the actuation of the truck's brakes.

When the actions exerted by the pressures of the air contained in chambers A and B tend to equilibrate, membrane 14, due to both its own resilience and the influence of spring 34, tends to resume its original position so as to re-engage gasket 32 with the housing thereof, wherefore the flowing of air between chambers C and B is cut off while the pressure in chamber B and consequently also in the actuating means of the brakes is kept in relation to the pressure existing in chamber A. More precisely, the pressure existing in chamber A maintains elastic membrane 14 bent only limitedly and to such an extent so as to realize a condition of equilibrium whereby gasket 32 closes off the air flow while membrane 14, due to its engaging ring-shaped member 18, shuts off the communication of chamber B with the bore of bush 20.

When the pressure in chamber A is reduced or cancelled out, membrane 14 disengages from ring-shaped member 18 wherefore chamber B is put in communication with the atmosphere through bores 28 of bottom cap 24 and consequently the air in said chamber and in the actuating means of the brakes is discharged and said brakes become inoperative. When the action of the modulate braking comes to an end, the air contained in chambers A, M and H is discharged through the distributor of the braking system in the known way.

(4) *Automatic braking*

When the trailer is detached or when it accidentally breaks from the tractor, service control line connector G and emergency line connector F are both put in communication with the atmosphere. Compressed air contained in chamber D is discharged through said connector F wherefore the compressed air contained in chamber E and which comes from the trailer's reservoir shifts differential piston 40 in opposition to the action of spring 52 so that rod 44 by engaging valve 62, at first shuts off the communication between chamber H and connector G and thereafter displaces valve 62 from its seat, thus establishing the communication between said chamber H and chamber K.

The displacing of differential piston 40 gives also rise to the displacing of bottom cap 46 which engages neck 48 causing thus a restriction to the flow of the air evacuating from connection $C_1$ and which flows to chamber C through chamber E.

The air evacuating from chamber K passes into chamber H and passes, too, through passage 76, into chambers M and N and from the latter, through passage 106, arrives at chamber A therein influencing membrane 14 which thus deformated acts on bush 20 in opposition to the action of spring 34 as previously considered.

It follows that the compressed air contained in chamber C is conveyed through chamber B and connector $B_1$ to the braking members of the trailer which are actuated in the previously described manner.

Attention is called to the fact that according to this invention the bottom cap 46 insertable within neck 48 reduces the passage section of compressed air from connector $C_1$ to chamber C which makes that said air flows only gradually into said chamber C wherefore the operating means of the trailer's brakes are actuated gradually and their highest braking power is attained after a certain lapse of time during which the pressure difference between air in connector $C_1$ and air in chamber C reduces and cancels out.

A gradual and progressive braking of the trailer is thus made, whose apex is achieved after a pre-established lapse of time determined by the extent of the neck originated between member 46 and member 48. Abnormal stress on the structure of the vehicle and dangerous side skiddings of the trailer especially when the latter accidentally breaks from the truck while in motion are thus avoided.

(5) *Application and release of the brakes of the trailer only*

As a rule, when the trailer is detached from the towing vehicle, the former is automatically braked according to the foregoing.

Taking into consideration the trailer when braked, in order to have it unbraked it is only necessary to pull the manually actuatable grip P in the direction as indicated by arrow X. It follows that rod 82 disengages from valve 86 and the latter, under the influence of the related spring 88, engages against its seat. On the other hand, said rod 82 disengaging from valve 86 opens communication, through said rod's bore, between chamber N and opening 94 and thence with the atmosphere. Therefore, the pressure air in chamber A is discharged and membrane 14, due to its own elasticity, disengages from ring-shaped member 18 thus putting in communication with the atmosphere through bores 28 both chamber B and the members actuating the trailer's brakes which are rendered inactive.

Rod 82 is maintained in the considered position by rotating it 180° so as to cause plug 102 to engage notch 104.

If it is desired to again brake the trailer, it is only necessary to restore rod 82 to its position of engagement with valve 86 in order to resume the air flow from chamber M to chamber N and thereafter to chamber A.

Referring to FIGURE 5 the same shows a sectional view of a servo autodistributor of a type with two membranes opposite each other. The first section is identical to that of FIGURE 1, wherefore the reference numerals and letters are left unchanged. The second section is similar to the first one and its corresponding parts are indicated by odd numbers.

In this variant, chamber A is deliminated by the two membranes 14 and 15 facing each other and tightened to each other with the interposition of a spacer 110.

The edges of cups 12 and 13 thus retain the edges of said membranes with spacer 110. Cup 12 supports the device for applying or releasing the trailer's brakes and communicates through passage 106 with aforesaid chamber A.

Passage 68 which starts from connector F, in its upper part provides a derivation 112 which extends through spacer 110 and membranes 14 and 15 and communicates with corresponding passage 69 which, through derivation 51 arrives at chamber D' whereinto travels a piston 41 influenced by a coil spring 53. To one of the ends of piston 41 is cooperatable a stem 43 which through a gasket 116 projects into chamber E', said chamber E' comprising a bottom cap 47 which, properly operated, engages an aperture 49 in such a manner so as to form between chambers C' and E' a narrowed passageway equal to that provided between chambers C and E.

The movements made by piston 41 under the influence of a spring 53 are controlled by a stop-rod 118 cooperatable with stem 43 and which cooperates with the bottom of chamber C' as will be hereinafter explained.

The manner in which the aforesaid two-section servo autodistributor operates is similar to that of the one-section servo distributor, considering also that:

(1a) *Replenishment of the trailer's reservoirs*

The replenishment of the trailer's reservoirs with compressed air is made through connector F. From said connector the air flows into passage 68, displaces valve 70 from its seat and through connector $C_1$ fills the reservoir of the first braking section. From passage 68 compressed air flows also into passage 112, displaces valve 71 from its seat and proceeds into chamber C', thence into passage 39, into chamber E', and through connector $C_1'$ into the reservoir of the second braking section.

From passage 112 the compressed air flows also, through passages 69–51 into chamber D', in order to influence piston 41 and moves it to the position illustrated in FIGURE 5 in opposition to the contrasting influence of spring 53, whereupon, bottom cap 47 disengages from neck 49 thus opening the communication between connector $C_1'$ and chamber E', all of the preceding occurrences being exactly the same as in the first section.

(2a) *Normal braking*

Normal braking is performed in a like manner as with the one-section servo autodistributor. Compressed air contained in connector G flows into chambers H and N and thence into chamber A deforming both membranes 14 and 15. Valves 32 and 33 are thus displaced from their respective seats allowing compressed air contained in chambers C and C' to arrive at the actuating members of the two sections of brakes through connectors $B_1$ and $B_1'$.

(3a) *Automatic braking*

Having regard to the first section, the automatic braking is performed in the manner as already described. The same is true with the second section, viz. as soon as connector F communicates with the atmosphere, compressed air contained in chamber D' discharges into the atmosphere. Spring 53 moves the related piston 41 no longer influenced by compressed air, and said piston stops with stop-rod 118 against the wall of chamber C' so that bottom cap 47 engages within neck 49 in order to reduce the air flow from chamber C' to connector $C_1'$. The second section's brakes are actuated gradually in a similar manner as those of the first section.

(4a) *Application and release of the trailer's brakes*

The application and release of the brakes of the trailer when the same is detached from the towing vehicle are performed in a similar manner as with the one-sector servo autodistributor.

The communication of chamber N with the atmosphere gives also rise to the discharge of compressed air contained in chamber A whereby membranes 14 and 15 resuming their original positions re-engage valves 32 and 33 against their seats and put in communication with the atmosphere chambers B and B' and consequently also the means actuating the trailer's brakes, said brakes being thus rendered inactive. The manoeuvre of member P for unseating valve 86 shuts off communication of chamber N with the atmosphere feeding said chambers N and A with compressed air so that brakes may be actuated again.

Two-section servo autodistributors are a valid contribution to a greater dependability of the vehicle while in motion in that a breakdown or failure of the members of one section does not affect the possibility of braking the trailer, such possibility being reduced but remaining efficient to perform the braking even if within a greater distance travelled after application of the brakes.

The advantages shown by membrane servo autodistributors and more particularly the possibility of increasing the trailer's braking power in respect to the truck's, may be extended also to piston servo autodistributors with either one or two sections.

FIGURES 6 to 9 of the accompanying drawings illustrate a one-section servo autodistributor, whose corresponding parts in relation to the ones of FIGURES 1 to 5 are identified by the same reference numerals. Said servo autodistributor comprises a casing 10 wherein the various parts are arranged; in its upper portion, said casing provides two cylinders 120–122 for related pistons 124–126 made cooperatable with each other by means of a bored stem 128, said pistons being so shaped as to form a differential piston.

Piston 126 provides at its lower end a rod 130 forming a seat for a disc valve 132 guided by a ring member 134 cooperatable with said piston. Valve 132 (FIGURES 7 to 9) is solid with a second valve 136 influenced by a spring 138 which holds it pressed against the seat thereof 140 provided by an intermediate wall 142, said wall separating chambers B and C each from the other. In FIGURE 6, due to its schematic representation, valves 132 and 136 are illustrated as an only disc-like member 132 influenced by spring 138. The two pistons 124–126 delimitate an intermediate chamber Q permanently communicating with the atmosphere through opening 28 fitted with a suitable filter so as to prevent the entry of foreign matter from the outside, while chamber B communicates with said chamber Q through rod 130 and bored stem 128.

Figure 8:
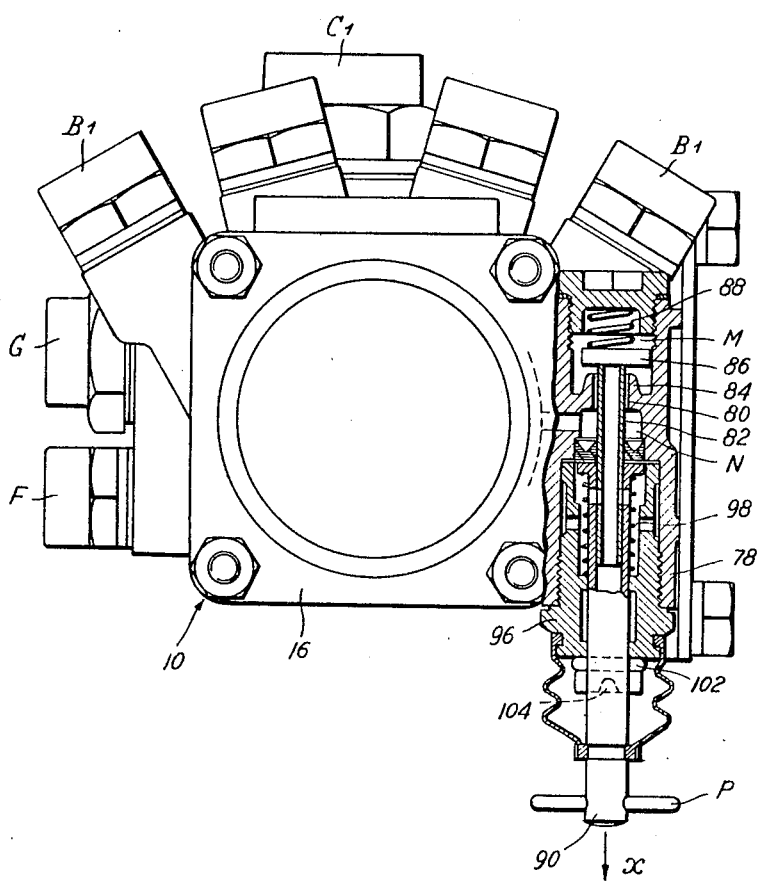
FIGURE 8 is a diagrammatic view, with parts in section, of FIGURE 7.
Figure 9:
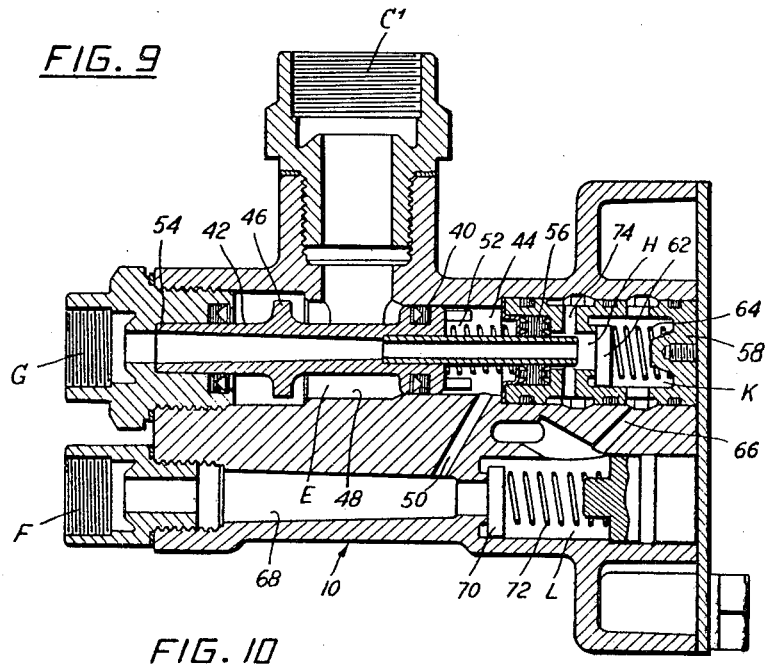
FIGURE 9 is a sectional view taken on the line IX—IX of FIGURE 7.

The remaining parts are similar to those described in connection with the servo autodistributor illustrated by FIGURES 1 to 5. Referring to FIGURES 7, 8 and 9, connectors $C_1$, F and G, and so the related members are provided, by a basic body secured to casing 10 and provided with suitable conduits apt to establish the necessary pneumatic circuits.

Having regard to the way in which this servo autodistributor operates, it is the same as with the preceding ones. The flow of compressed air into chamber A moves pistons 126–128 in opposition to the action of spring 34 giving rise to the closure of communication between chambers B and Q through valve 132 and opening communication between chambers C and D through valve 136.

Figure 10:
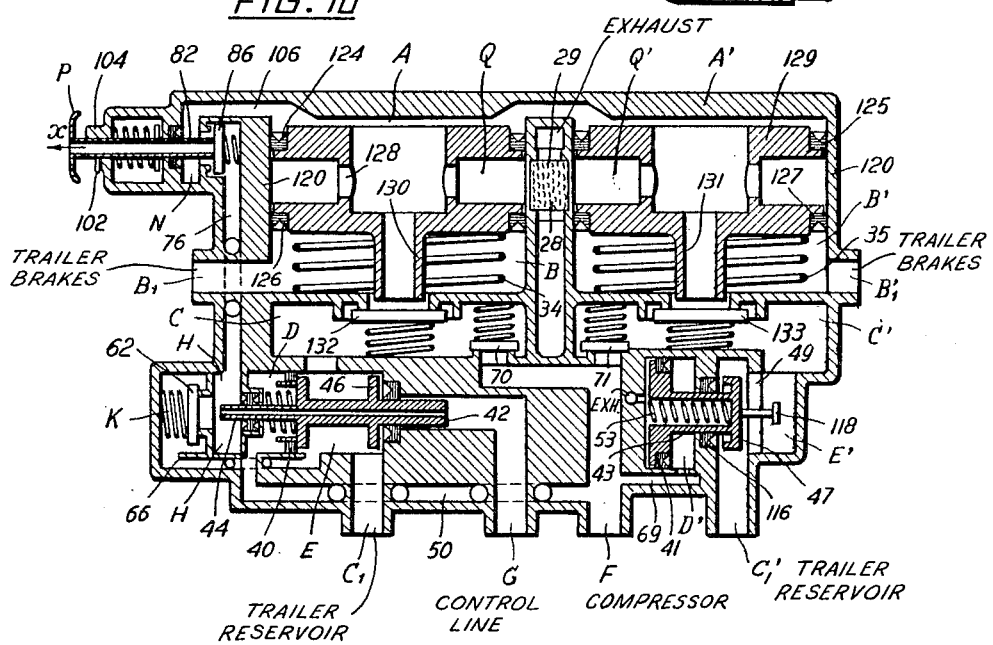
FIGURE 10 is the sectional view of a two-section piston servo autodistributor.

FIGURE 10 illustrates a piston servo autodistributor with two sections. From said figure it appears that the second section is similar to the first one, wherefore the corresponding parts are identified by the same reference numbers.

On the other hand and keeping in mind all that has been said in connection with the servo autodistributor referred to in FIGURE 5, the remaining parts are similar to those referred to in said FIGURE 5 and already described. The same is true with regard to the manner in which it operates, it being similar to that of servo autodistributor referred to in FIGURE 5, whereto please refer.

Figure 2:
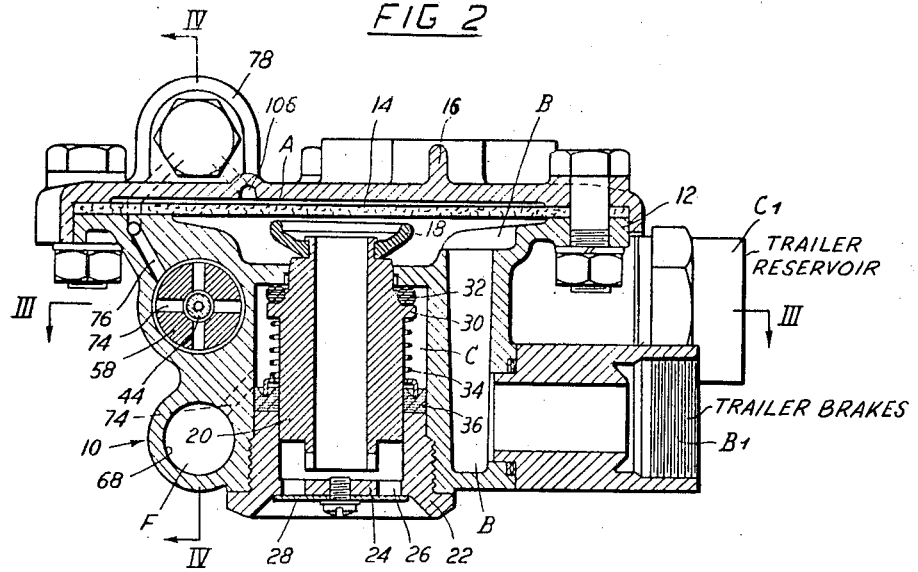
FIGURE 2 is a vertical sectional view of a preferred embodiment of the servo autodistributor according to FIGURE 1.

The further embodiments illustrated in FIGURES 11 and 12 are similar to those illustrated by FIGURES 1 and 2 and relate to servo autodistributors so realized as to automatically perform the modulated emergency braking of the trailer. To rod 44 pertaining to the first set of change-over valves (which controls the communication of chamber H with connector G for the gradual braking, with chamber K connected through passage 66 with collecting chamber C and through passage 76 and the set of manually actuatable valves 84–86 with chamber A) is cooperatable a piston 150 travelling in cylinder 152 carried by casing 10 of the servo autodistributor.

One of the chambers delimitated by piston 150 in related cylinder 152 is in direct communication with previously considered chamber H, whereas the other chamber of said cylinder-piston set communicates through a port with the atmosphere.

These just considered servo autodistributors operate in the same manner as those referred to in FIGURES 1 and 2, except for the automatic and controlled brakings. It is based on the premise that the pneumatic braking plant installed on the truck is completed with a commutable cut-off member inserted in emergency line and which connects said line with either the exhaust or the source of compressed air installed on the truck.

It follows that by actuating said member so as to connect automatic braking connector F with the exhaust, the pressure existing in chamber D is reduced and the pressure existing in chamber E influences piston 40.

Rod 44 thus moves from right to left and its end engages valve 62 displacing it from the seat thereof in order to open communication between chambers H and K. The compressed air evacuated from passage 76 and existing in chamber H exerts upon piston 150 a thrust which balances the pressure difference between chambers D and E. It follows that the pressure existing in chamber H and thence in chamber K and which influences membrane 14 of FIGURE 1 or piston 124 of FIGURE 12, may be modulated by actuating the aforesaid commutable cut-off member located in the driver's cab. Therefore, the group of change-over valves which is actuated either by membrane 14 of FIGURE 11 or by the set of pistons 124–126 of FIGURE 12 is actuated so as to effect the modulated flow of air to the braking means of the trailer through connector B.

The servo autodistributors heretofore described and illustrated are of simple realization and easy control. It is to be understood that the same are susceptible to many changes and modifications, such as the principle whereby is realized the delay in establishing pressure between chamber C and connector $C_1$, which principle may be put in practice in many diverse manners, e.g. in neck 48 may be inserted a shutter 46 which is gradually opened by fluid-operated delaying devices properly inserted between stem 42 and said shutter 46; or shutter 46 may be so shaped as to gradually vary the just-considered passage sections. Said shutter may fully close the passage and be provided with suitable holes of a desired diameter through which the air may pass at the desired rate from chamber C to connector $C_1$. Or said shutter 46 may be secured to stem 42 in such a manner that it is possible to regulate as desired the flow of compressed air from chamber C to connector $C_1$. All that has been said above in connection with member 46 is valid for member 47 of FIGURES 5 and 10, as well.

Referring to FIGURES 11 and 12, shut-off or throttling means 46 may regulate the flow of compressed air jointly with piston 150.

All these or any other changes and modifications are intended to be included within the purview of the present invention without, however, departing from the scope and spirit of the invention.

We claim:

1. A servo autodistributor for trailer vehicles provided with pneumatic actuated brakes and a pressurized fluid reservoir, said autodistributor comprising a collecting chamber, means including a check valve for connecting the collecting chamber to a source of pressurized fluid, first valve means selectively connecting the trailer brake actuating means to the collecting chamber and the atmosphere, first differential pressure means connected to said valve means for moving the valve means according to the difference between the pressure in the brake actuating means and a control pressure, a throttling chamber connecting said collecting chamber to said pressure fluid reservoir, throttling means for restricting said conduit, and second differential pressure means responsive to the pressure difference across said check valve for moving said throttling means to restricting position when the pressure in said collecting chamber exceeds the pressure of said source of pressurized fluid to limit the rate of flow of fluid from the reservoir to the brake actuating means.

2. In a servo distributor according to claim 1, conduit means interconnecting said throttling chamber and a control pressure line connected to the control side of said first differential pressure means, and valve means cooperating with said conduit means for selectively connecting said control side to said throttling chamber and said control pressure line, said valve means being operatively connected to said second differential pressure means to connect said throttling chamber to said differential pressure means when the throttling valve means is in closed position.

3. A servo distributor according to claim 1 in which said first differential pressure means comprises a control pressure chamber, a brake actuator pressure chamber and a deformable membrane separating said chambers, said first valve means comprising a spring urged tubular member having an end juxtaposed to the membrane and having its interior open to atmosphere and having an annular valve face, a valve seat on a partition separating the brake actuator pressure chamber from the collecting chamber, said membrane being adapted to first close the end of the tubular member and then displace the member to open the valve.

4. A servo distributor according to claim 3 comprising valve means selectively connecting said control pressure chamber to a control pressure and to said pressure fluid reservoir, said valve means having an operative connection to said second pressure differential means to be operated thereby.

5. A servo distributor according to claim 1 in which said first differential pressure means comprises a first chamber connected to a control pressure, a second chamber connected to brake actuating means, a piston having spaced apart heads separating the chambers, a spring loaded valve connecting said second chamber to the collecting chamber, and a hollow valve actuator extending from the piston through the second chamber to actuate said spring loaded valve, and a chamber in said piston between said spaced apart heads that is connected to said hollow actuator and to atmosphere.

6. A servo autodistributor for trailer vehicles provided with pneumatically actuated brakes and a pressure fluid reservoir, said autodistributor comprising a collecting chamber, means including a check valve for connecting the collecting chamber to a source of pressurized fluid, first valve means selectively connecting the trailer brake actuating means to the collecting chamber and the atmosphere, first differential pressure means connected to said valve means for moving the valve means according to the difference between the pressure in the brake actuating means and a control pressure, a conduit connecting said collecting chamber to said pressure fluid reservoir, throttling means movable into position to restrict said conduit and means responsive to the pressure from the source of pressurized fluid connected to the throttling means and adapted in response to pressure to hold said throttling means in non-throttling position.

7. A servo distributor according to claim 3 comprising a second distributor serving a second set of brake actuating means, said second distributor having a second deformable membrane cooperating with said first mentioned deformable membrane to define said control pressure chamber whereby the second set of brakes actuating means is controlled by the control pressure of the first distributor.

8. A servo autodistributor according to claim 5 comprising a second distributor adapted to supply a second set of brake actuating means, said second distributor having first chamber in constant open communication with the first chamber of the first distributor, whereby the control pressures effective in the first distributor are effective in the second distributor.

9. In a servo autodistributor according to claim 1, a piston and cylinder subjected to said control pressure, said piston being operatively connected to said second differential means and acting in opposition to said collecting chamber pressure, whereby said throttling means is held in non throttling position by control pressure applied to said piston.

10. A servo autodistributor according to claim 9 in which the second differential pressure means comprises a first and a second piston and a throttling valve mounted on a hollow rod, a cylinder housing the first piston and having a first chamber communicating through the hollow rod with a region continuously subjected to control pressure, and a second chamber communicating with atmosphere, a second cylinder housing the second piston and having a chamber connected to the source of pressurized fluid and a throttling chamber connected to said collecting chamber, said throttling valve being adapted to restrict flow from said reservoir to said collecting chamber when said reservoir pressure exceeds the control pressure and the pressure of said source.

References Cited by the Examiner

UNITED STATES PATENTS

| | | | |
|---|---|---|---|
| 2,441,050 | 5/48 | Wiegers | 303—29 |
| 2,883,997 | 4/59 | Schultz. | |
| 3,097,020 | 7/63 | Alfieri | 303—29 |

MILTON BUCHLER, *Primary Examiner.*

FERGUS S. MIDDLETON, *Examiner.*